M. P. BROWN.
CORN-GATHERER.

No. 190,546.

2 Sheets—Sheet 1.

Patented May 8, 1877.

Attest
Walter Knight
Harry E. Knight

M. P. Brown
By Knight Bros
Attys.

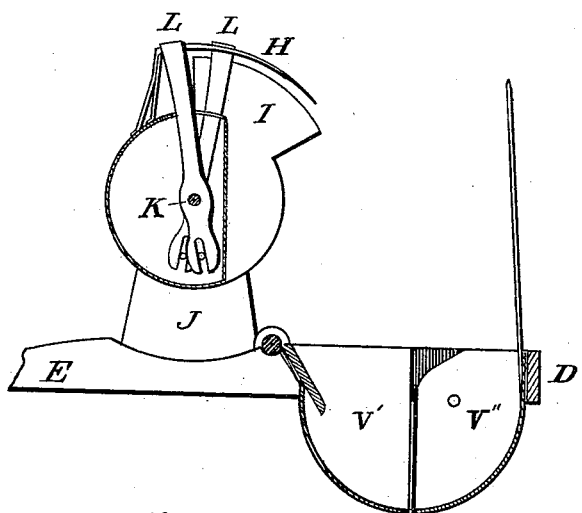
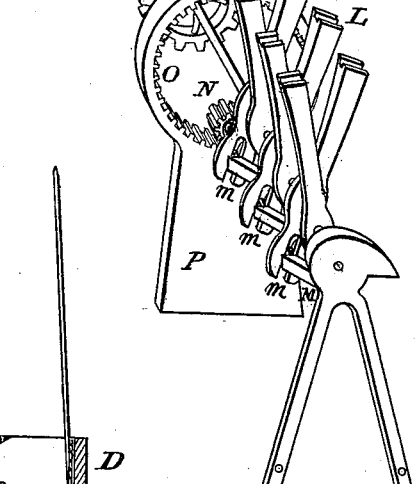
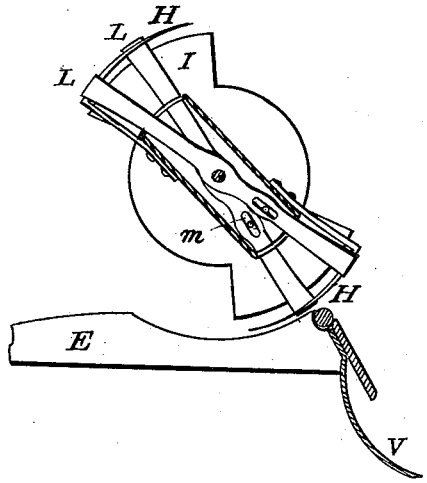
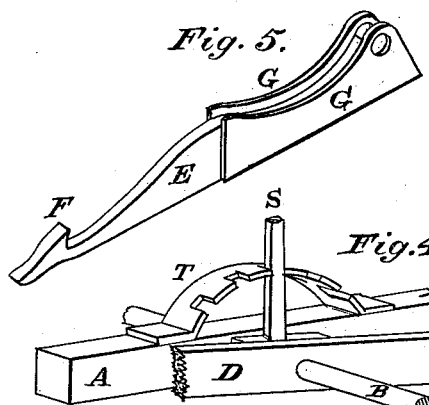
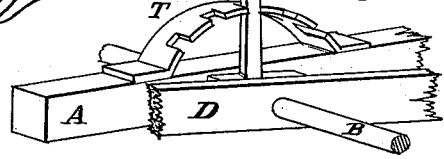

UNITED STATES PATENT OFFICE.

MERCILEUS P. BROWN, OF LEXINGTON, ASSIGNOR OF ONE-HALF HIS RIGHT TO WILLIAM M. JORDAN, OF LA FAYETTE, MISSOURI.

IMPROVEMENT IN CORN-GATHERERS.

Specification forming part of Letters Patent No. 190,546, dated May 8, 1877; application filed February 23, 1877.

*To all whom it may concern:*

Be it known that I, MERCILEUS P. BROWN, of Lexington, La Fayette county, Missouri, have invented a new and useful Corn-Gatherer, of which the following is a specification:

My invention relates to an implement intended to be drawn along the ground between two rows of Indian corn, and to gather the ears and deposit them in heaps at the ends of the rows.

The operative members of my implement are mounted upon a wheeled carriage or running-gear, whose axle supports the operative members—independently of the carriage-bed—in such manner that said members may be set to any desired pitch or inclination, according to the nature of the ground and crop. The axle is so connected to the ground-wheels as to rotate whenever either wheel is advancing.

In order that the implement may be capable of operating upon two ears of corn simultaneously the operative members are duplicated. These operative members comprise, on each side of the implement, first, a gang of fingers arranged in parallel lines, and having a downward presentation forward, whose angle is adjustable at discretion of the operator. These fingers operate like a comb, to pass between the stems of corn, and lift and hold the ears for the action of the plucking mechanism. Secondly, a gang of revolving teeth, which, in conjunction with revolving and vibrating members, called by me "snappers," operate to pluck the ears loose from their stems, and then to project them rearward into a suitable spout, crib, or receiver, whence they are discharged onto the ground.

My invention, in its preferred form, further comprehends certain accessory devices hereinafter described.

Figure 1:
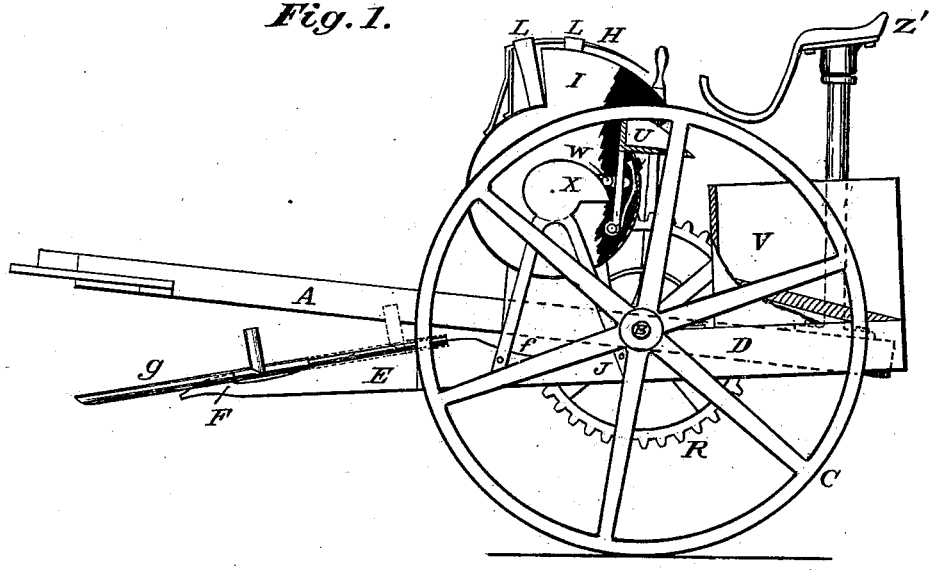
Figure 2:
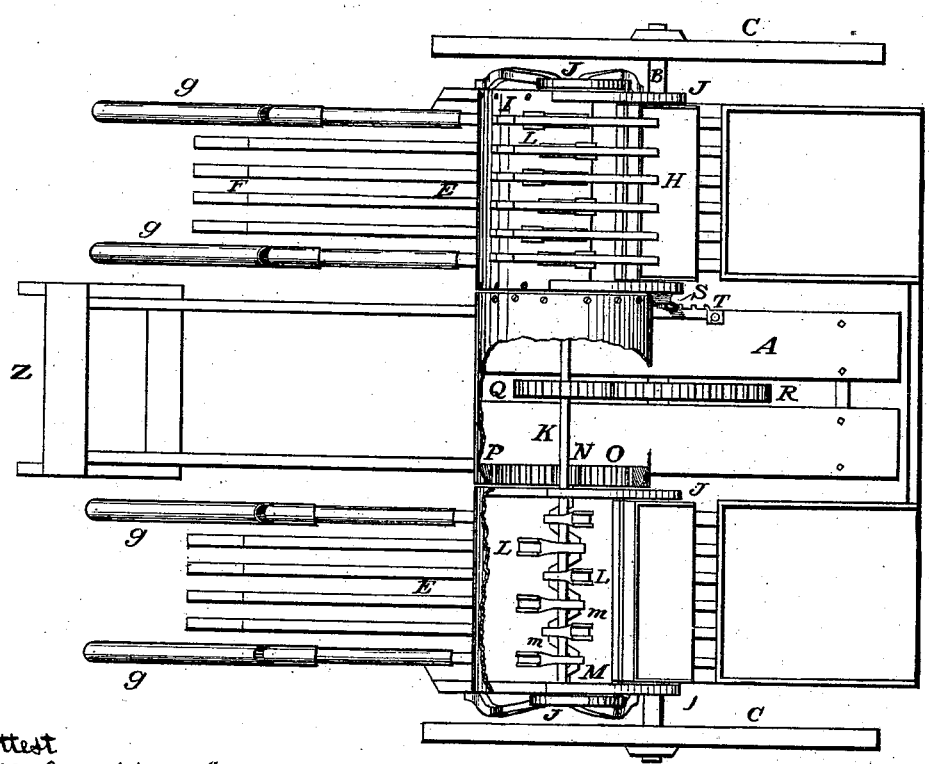

In the accompanying drawings, Figure 1 is a side elevation of a corn-gatherer embodying my invention. Fig. 2 is a top view of the same.

In both of the above views portions of the inclosing casing are removed to expose the operative parts.

Figs. 3, 4, and 5 represent, by perspective view, portions of the operative parts detached.

Fig. 6 shows, by vertical section, a modification of my plucking and discharging mechanism. Fig. 7 is a similar section, showing another modification of my plucking mechanism. Fig. 8 represents, by perspective view, one of my gathering-fingers detached.

A represents the bed or frame, B the axle, and C the ground-wheels, of a suitable running-gear or carriage, A B C. The wheels C are connected to axle B by customary ratchets, so as to compel rotation of axle with any advance of either wheel.

Mounted upon the same axle, and capable of independent oscillation thereupon, is the frame D of the two sets of operative members, constituting the corn-gatherer proper.

Each set of operating members consists as follows: Projecting forward from the frame D is a gang of fingers, E, parallel to one another, and of such distance apart as to afford easy passage for the thickest corn-stalks. As viewed in profile, these fingers are seen to taper toward their forward extremities, near which they have, on their upper side, a barb or projection, F.

The upper edges of the fingers, near their rear, are concaved, as at $f$, so as to present a surface concentric with the sweep of my plucking-teeth, to be presently described; and this portion of my fingers is channeled by the addition of curbs G, with the object of supporting the ears of corn clear of the fingers, and thus permitting the ready insertion beneath the ears of my said plucking-teeth. These plucking-teeth are shown at H, and consist of hooked projections from a cylinder, I, which journals in standards J, erected upon the frame D.

The outermost fingers of each gang are furnished with slidable sheaths $g$, which render said fingers capable of being lengthened for the purpose of elevating down stalks, and which also serve as fenders to prevent the rolling off sidewise of any loose ears.

Journaled at their mid-length upon the central shaft or axis K of the cylinders I are a series of bars, L, which I call the "snappers." These bars are forked or indented at their front extremities to embrace the pluckers H, and at their rear extremities to receive the wrists $m$ of crank-shaft M, which is rotated by engagement of its pinion N in circular rack O upon a standard, P, which rises from the frame D.

The cylinders I are rotated by engagement of pinion Q on their common axis K with the spur-wheel R upon the main axle B.

The gatherer proper is adjusted and held to any desired angle (pitch) by the instrumentality of a lever, S, which engages within a segment-rack, T, upon the carriage-bed A.

A hod, U, whose helve is pivoted to the cylinder, receives the ears of corn from the pluckers, and tosses them into a chute or crib, V, whence they fall or are discharged onto the ground. This action of the hod is secured by imparting to it an intermittent vibratory movement, caused by the impingement of a projection, W, from the hod upon the periphery of a cam, X, attached to one of the standards. A spring, Y, operates to retract the hod U the instant it has escaped the cam X.

The frame A is provided with a pair of thills, Z, for engagement of the team, and a customary seat, Z′, for the driver.

The operation of the implement is as follows:

The gatherer, being presented with the team midway between two consecutive rows, and adjusted to such a pitch as to present its finger-tips lower than the lowest ears, is drawn forward, so as to engage the fingers E between the plants, which, slipping rearward along the interstices of the fingers, are held by the latter in position for engagement under them of the revolving teeth H. At this juncture the snappers L strike the ears, and complete their severance from their stalks. The continued rotation of the gathering-teeth rearward operates to throw the thus severed ears into the hod U, which, in turn, tosses them into the chute or crib V, whence they fall or are discharged onto the ground.

The slidable prolongations $g$ of the outermost fingers enable them to scoop up any fallen stalks, and to thus bring them under action of the plucking devices, and said members $g$ also serve to secure any ears of corn that may become detached from their stalks before reaching the plucking-teeth, and thus insure their conveyance rearward by the pressure of the stalks that succeed them in the row, while the escape of loose ears forward is prevented by the barbs F.

Should the driver discover that the pitch of the gathering-fingers is not sufficient to enable them to secure the lowest ears, he can, without leaving his seat, remedy the defect by a forward movement of the lever S; or should he, on the contrary, observe that the fingers are unnecessarily depressed, he can elevate them by a rearward shift of the same lever.

Having reached the end of the row, the driver can, by means of the lever S, elevate the points of the fingers entirely clear of the corn, so as to prevent their collision with the plants until the implement is brought in range with the next two rows of corn, which having been accomplished, the driver depresses the fingers to their former position, and proceeds as before.

A very fortunate feature in this invention consists in the "building up," so to speak, of one motion on another, so as to obtain a very rapid action of the plucking mechanism from a moderate rate of travel of the implement. Thus, the cylinders I turning in the direction of draft, their motion is added to the speed of the machine, and again, as the snappers or vibrating bars L act in the same direction, their motion also is added to the other two, making a rapid approach of said snappers to the corn, produced by the co-operation of three slower motions. This relatively quick motion of the snappers is of vital importance, because the corn has to be delivered from under the teeth H, which teeth are moving in the same direction as that in which the delivery of the ears has to be made.

Each cylinder may have two sets of plucking-teeth, as at H in Fig. 7, and the snappers be double-ended, as at L in that figure.

In some cases the snappers may be omitted, and sufficient speed be imparted to the rotary teeth to effect the plucking of the ears.

A dumping-crib, such as that shown in Fig. 6, may be employed in conjunction with the vibrating hod U, or otherwise.

The ground-wheels C may be either fastened to the axle B, or connected to it by pawl and ratchet, so as to compel rotation of the axle only when the implement is advancing.

I claim as new and of my invention—

1. The combination of the rotary plucking-teeth H and vibratory snappers L, for the purpose set forth.

2. The combination of the rotary plucking-teeth H and the concentric concave and channeled gathering-fingers E, as and for the purpose set forth.

3. The sliding sheaths or extensions $g$, as and for the objects stated, in combination with the guards of a corn-gatherer.

4. The automatically-vibrated hod U, in combination with the rotary pluckers H and the receiving-chutes V.

5. The hod U, pivoted to the plucking-cylinder, and automatically vibrated by means of the wrist W, stationary cam X, and retracting-spring Y.

6. The combination of double-ended snappers L with the double series of pluckers H on a single rotary cylinder, I, as set forth.

In testimony of which invention I hereunto set my hand.

MERCILEUS P. BROWN.

Attest:
  GEO. H. KNIGHT,
  WALTER KNIGHT.